United States Patent
Divakaran et al.

(10) Patent No.: US 7,110,458 B2
(45) Date of Patent: Sep. 19, 2006

(54) METHOD FOR SUMMARIZING A VIDEO USING MOTION DESCRIPTORS

(75) Inventors: Ajay Divakaran, Denville, NJ (US); Regunathan Radhakrishnan, Ozone Park, NY (US); Kadir A. Peker, Paterson, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 393 days.

(21) Appl. No.: 09/845,009

(22) Filed: Apr. 27, 2001

(65) Prior Publication Data

US 2003/0007555 A1 Jan. 9, 2003

(51) Int. Cl.
*H04N 7/18* (2006.01)
(52) U.S. Cl. .............................. 375/240.25; 375/240.29
(58) Field of Classification Search ................. 375/240.01–240.29; 348/699–701
See application file for complete search history.

(56) References Cited

U.S. PATENT DOCUMENTS

| | | | | |
|---|---|---|---|---|
| 5,767,922 A | * | 6/1998 | Zabih et al. | 348/700 |
| 5,870,754 A | * | 2/1999 | Dimitrova et al. | 707/104.1 |
| 5,877,778 A | * | 3/1999 | Dow et al. | 345/474 |
| 5,893,095 A | * | 4/1999 | Jain et al. | 707/6 |
| 6,104,441 A | * | 8/2000 | Wee et al. | 375/240.15 |
| 6,125,229 A | * | 9/2000 | Dimitrova et al. | 386/69 |
| 6,236,395 B1 | * | 5/2001 | Sezan et al. | 345/723 |
| 6,549,643 B1 | * | 4/2003 | Toklu et al. | 382/107 |
| 6,597,738 B1 | * | 7/2003 | Park et al. | 375/240.16 |
| 6,985,623 B1 | * | 1/2006 | Prakash et al. | 382/173 |

\* cited by examiner

*Primary Examiner*—Andy Rao
(74) *Attorney, Agent, or Firm*—Dirk Brinkman; Andrew J. Curtis (57) ABSTRACT

A method measures an intensity of motion activity in a compressed video. The intensity of the motion activity is used to partition the video into segments of equal cumulative motion activity. Key-frames are then selected from each segments. The selected key-frames are concatenated in temporal order to form a summary of the video.

10 Claims, 6 Drawing Sheets

*Fig. 1*
PRIOT ART

METHOD FOR SUMMARIZING A VIDEO USING MOTION DESCRIPTORS

FIELD OF THE INVENTION

This invention relates generally to videos, and more particularly to summarizing a compressed video.

BACKGROUND OF THE INVENTION

It is desired to automatically generate summaries of videos, and more particularly, to generate the summaries of a compressed digital videos.

Compressed Video Formats

Basic standards for compressing a video as a digital signal have been adopted by the Motion Picture Expert Group (MPEG). The MPEG standards achieve high data compression rates by developing information for a full frame of the image only every so often. The full image frames, i.e., intra-coded frames, are often referred to as "I-frames" or "anchor frames," and contain full frame information independent of any other frames. Image difference frames, i.e., inter-coded frames, are often referred to as "B-frames" and "P-frames," or as "predictive frames," and are encoded between the I-frames and reflect only image differences i.e., residues, with respect to the reference frame.

Typically, each frame of a video sequence is partitioned into smaller blocks of picture elements, i.e., pixel data. Each block is subjected to a discrete cosine transformation (DCT) function to convert the statistically dependent spatial domain pixels into independent frequency domain DCT coefficients. Respective 8×8 or 16×16 blocks of pixels, referred to as "macro-blocks," are subjected to the DCT function to provide the coded signal.

The DCT coefficients are usually energy concentrated so that only a few of the coefficients in a macro-block contain the main part of the picture information. For example, if a macro-block contains an edge boundary of an object, then the energy in that block includes a relatively large DC coefficient and randomly distributed AC coefficients throughout the matrix of coefficients.

A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded. Thus, the macro-blocks of transmitted data typically include fewer than an 8×8 matrix of codewords.

The macro-blocks of inter-coded frame data, i.e., encoded P or B frame data, include DCT coefficients which represent only the differences between a predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P-frame is predicted from the last I- or P-frame. Each B-frame is predicted from an I- or P-frame between which it is disposed. The predictive coding process involves generating displacement vectors, often referred to as "motion vectors," which indicate the magnitude of the displacement to the macro-block of an I-frame most closely matches the macro-block of the B- or P-frame currently being coded. The pixel data of the matched block in the I frame is subtracted, on a pixel-by-pixel basis, from the block of the P- or B-frame being encoded, to develop the residues. The transformed residues and the vectors form part of the encoded data for the P- and B-frames.

Video Analysis

Video analysis can be defined as processing a video with the intention of understanding the content of a video. The understanding of a video can range from a "low-level" syntactic understanding, such as detecting segment boundaries in the video, to a "high-level" semantic understanding, such as detecting a genre of the video. The low-level understanding can be achieved by analyzing low-level features, such as color, motion, texture, shape, and the like, to generate content descriptions. The content description can then be used to index the video.

Video Summarization

Video summarization generates a compact representation of a video that conveys the semantic essence of the video. The compact representation can include "key-frames" or "key-segments," or a combination of key-frames and key-segments. As an example, a video summary of a tennis match can include two frames, the first frame capturing both of the players, and the second frame capturing the winner with the trophy. A more detailed and longer summary could further include all frames that capture the match point. While it is certainly possible to generate such a summary manually, this is tedious and costly. Automatic summarization is therefore desired.

Automatic video summarization methods are well known, see S. Pfeifer et al. in "*Abstracting Digital Movies Automatically*," J. Visual Comm. Image Representation, vol. 7, no. 4, pp. 345–353, December 1996, and Hanjalic et al. in "*An Integrated Scheme for Automated Video Abstraction Based on Unsupervised Cluster-Validity Analysis*," IEEE Trans. On Circuits and Systems for Video Technology, Vol. 9, No. 8, December 1999.

Most prior video summarization methods focus almost exclusively on color-based summarization. Only Pfeiffer et al. has used motion, in combination with other features, to generate video summaries. However, their approach merely uses a weighted combination that overlooks possible correlation between the combined features. Some summarization methods also use motion features to extract key-frames.

Figure 1:
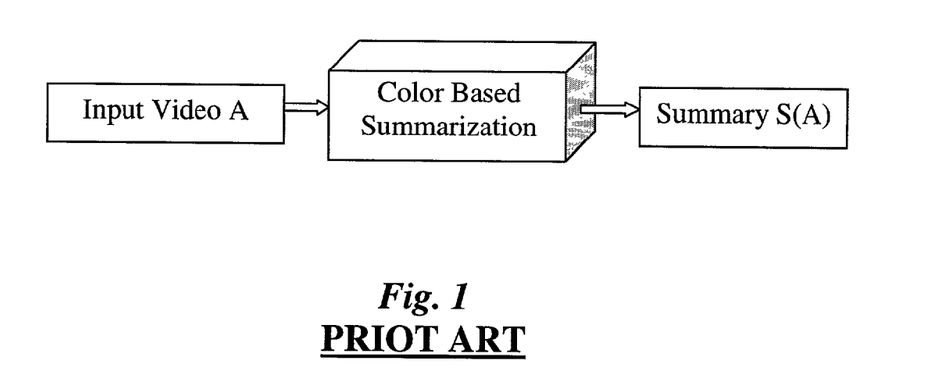
FIG. 1 is a block diagram of a prior art video summarization method.

As shown in FIG. 1, prior art video summarization methods have mostly emphasized clustering, based on color features, because color features are easy to extract in the compressed domain, and are robust to noise. A typical method takes a video sequence A 101 as input, and applies a color based summarization process 100 to produce a video summary S(A) 102. The video summary includes either a summary of the entire sequence, or a set of interesting segments of the sequence, or key-frames.

The method 100 typically includes the following steps. First, cluster the frames of the video according to color features. Second, arrange the clusters in an easy to access hierarchical data structure. Third, extract a key-frame or a key sequence from each of the cluster to generate the summary.

Motion Activity Descriptor

A video can also be intuitively perceived as having various levels of activity or intensity of action. An examples of a relatively high level of activity is a scoring opportunity in a sport video. On the other hand, a news reader video has a relatively low level of activity. The recently proposed MPEG-7 video standard provides for a descriptor related to the motion activity in a video.

One measure of motion activity can be the average and variance of the magnitude of the motion vectors, see Peker et al. "*Automatic measurement of intensity of motion activity*," Proceedings of SPIE Conference on Storage and Retrieval for Media Databases, January 2001. However, there are many variations possible, depending on the application.

Fidelity of a Set of Key-Frames

The simplest approach to finding a single key-frame is to select an arbitrary frame from the sequence, but single key-frame based approaches fail when the video content has more information than can be conveyed by the single frame. The first frame of a video segment can be assigned as the first key-frame, and then the frame at the greatest distance in feature space from the first frame can be assigned as the second key-frame, see In M. M. Yeung and B. Liu, "*Efficient Matching and Clustering of Video Shots*," Proc. IEEE ICIP, Washington D.C., 1995. Other multiple key-frame generation techniques, and a key-frame generation technique based on a measure of fidelity of a set of key-frames are described by H. S. Chang, S. Sull and S. U. Lee, "*Efficient video indexing scheme for content-based retrieval*," IEEE Transactions on Circuits and Systems for Video Technology, Vol. 9, No. 8, 1999. The fidelity measure is defined as the Semi-Hausdorff distance ($d_{hs}$) between the set of key-frames S and the set of frames R in the video sequences. A practical definition of the Semi-Hausdorff distance is as follows.

Let the set $S_i$ include of m frames for i=1, . . . , m, and let the set of frames $R_i$ include n frames for I=1, . . . , n. Let the distance between two frames $S_i$ and $R_i$ be $d(S_i, R_i)$. Define $d_i$ for each frame $R_i$ as $$d_i = \min(d(S_k, R_i)), k=0 \ldots m.$$

Then the Semi-Hausdorff distance between S and R is given by $$d_{sh}(S,R) = \max(d_i), i=1 \ldots n.$$

In other words, first for all i, measure the distance $d_i$ between the frame $R_i$ and its best representative in the key-frame set S. Next, find the maximum of the distances $d_i$ computed above. The distance represents how well the key-frame set S represents R. For a better representation, the Semi-Hausdorff distance between S and R is smaller. For example, in the trivial case, if the sets S and R are identical, then the Semi-Hausdorff distance is zero. On the other hand, a large distance indicates that at least one of the frames in R was not well represented by any of the frames in the key-frame set S.

Most existing dissimilarity measures satisfy the properties required for the distance over a metric space used in the above definition. One can also use a color histogram intersection metric described by M. J. Swain and D. H. Ballard, "*Color indexing*," J. Computer Vision, vol. 7, no. 1, pp. 11–32, 1991, which is defined as follows.

If the K-bin color histograms of two images $f_i$ and $f_j$ of size M×N, are $H_i$ and $H_j$, then the dissimilarity between the two images is given by $$d(f_i, f_j) = 1 - \frac{1}{M \times N} \sum_{k=1}^{K} \min\{H_i(k), H_j(k)\}.$$

Note that the dissimilarity is within the range [0, 1].

SUMMARY OF THE INVENTION

It is an objective of the present invention to provide an automatic video summarization method using motion features, specifically motion activity features by themselves and in conjunction with other low-level features, such as color and texture features.

The present invention is based on the following idea. The motion activity of a video is a good indication of the relative difficulty of summarization the video. The greater the amount of motion, the more difficult it is to summarize the video. A video summary can be quantitatively described by the number of frames it contains, for example, the number of key-frames, or the number of frames of a key segment.

The relative intensity of motion activity of a video is strongly correlated to changes in color characteristics. In other words, if the intensity of motion activity is high, there is a high likelihood that a change in color characteristics is also high. If the change in color characteristics is high, then a color feature based summary will include a relatively large number of frames, and if the change in color characteristics is low, then the summary will contain fewer frames. Another way to state this is to consider the fidelity of visual summaries consisting of key-frames selected from the video. If the length of the summary is held constant by keeping the number of key-frames constant, then the higher the intensity of motion activity of a shot, the lower the fidelity of its summary.

For example, a "talking head" video typically has a low level of motion activity and very little change in color as well. If the summarization is based on key-frames, then one key-frame would suffice to summarize the video. If key segments are used, then a one second sequence of frames would suffice to visually summarize the video. On the other hand, a scoring opportunity in a sporting event would have very high intensity of motion activity and color change, and would thus take several key-frames or several seconds to summarize.

More particularly, the invention provides a method that summarizes a video by first measuring the intensity of motion activity in a compressed video. Then, the intensity of motion activity is used to select key-frames from the video, without resorting to lengthy color based calculations.

The invention also provides a method to combine motion and color based key-frame extraction by using the motion based method for the easier to summarize segments, and the color based methods for the harder to summarize segments. Easier to summarize segments are represented by a rapidly extracted summary consisting of one or more key-frames, while a color based summarization process extracts sequences of frames from each difficult to summarize segment. The single frames and extracted sequences of frames are concatenated in temporal order to form the summary of the video.

More particularly, a method according to the invention measures an intensity of motion activity in a compressed video. The intensity of the motion activity is used to partition the video into segments of equal cumulative motion activity. Key-frames are then selected from each segments. The selected key-frames are concatenated in temporal order to form a summary of the video. In one embodiment, the first frame of each segment and the last frame of the sequence are selected to form the summary. In another embodiment, the middle frame, in terms of motion activity, is selected from each segment, and the partitioning is a binary partitioning based on a cumulative motion activity intensity.

DETAILED DESCRIPTION OF THE PREFERRED EMBODIMENT

Our invention summarizes a compressed video using motion features, and optionally color features. Therefore, our summarization method first measures these features from the compressed video.

Feature Extraction

Color Features

We can accurately extract DC coefficients of an I-frame using known techniques. For P- and B-frames, the DC coefficients can be approximated using motion vectors without full decompression, see, for example, Yeo et al. "*On the Extraction of DC Sequence from MPEG video*," IEEE ICIP Vol. 2, 1995. The YUV value of the DC image can be transformed to a different color space to extract the color features.

The most popular used technique uses a color histogram. Color histograms have been widely used in image and video indexing and retrieval, see Smith et al. in "*Automated Image Retrieval Using Color and Texture*," IEEE Transaction on Pattern Analysis and Machine Intelligence, 1996. Typically, in a three channel RGB color space, with four bins for each channel, a total of 64 (4×4×4) bins are needed for the color histogram.

Motion Features

Motion information can be extracted and measured from motion vectors in P- and B-frames. Because motion vectors are usually a crude and sparse approximation to real optical flow, we use motion vectors only qualitatively. Many different methods for extracting motion vectors are described, see Tan et al. "*A new method for camera motion parameter estimation*," Proc. IEEE International Conference on Image Processing, Vol. 2, pp. 722–726, 1995, Tan et al. "*Rapid estimation of camera motion from compressed video with application to video annotation*," to appear in IEEE Trans. on Circuits and Systems for Video Technology, 1999. Kobla et al. "*Detection of slow-motion replay sequences for identifying sports videos*," Proc. IEEE Workshop on Multimedia Signal Processing, 1999, Kobla et al. "*Special effect edit detection using VideoTrails: a comparison with existing techniques*," Proc. SPIE Conference on Storage and Retrieval for Image and Video Databases VII, 1999, Kobla et al., "*Compressed domain video indexing techniques using DCT and motion vector information in MPEG video*," Proc. SPIE Conference on Storage and Retrieval for Image and Video Databases V, SPIE Vol. 3022, pp. 200–211, 1997, and Meng et al. "*CVEPS—a compressed video editing and parsing system*," Proc. ACM Multimedia 96, 1996.

As stated above, most prior art summarization methods are based on clustering color features to obtain color descriptors. While color descriptors are relatively robust to noise, by definition, they do not include the motion characteristics of the video. However, motion descriptors tend to be less robust to noise, and therefore, they have not been as widely used for summarizing videos.

U.S. patent application Ser. No. 09/406,444 "Activity Descriptor for Video Sequences," filed by Divakaran et al., filed on Aug. 9, 2000, incorporated herein by reference, describes how motion features derived from motion vectors in a compressed video can be used to determine motion activity and the spatial distribution of the motion activity in the video. Such descriptors are useful for video browsing applications, as described therein. Herein, we apply such motion descriptors to a novel video summarization.

We believe that motion is a strong indicator how much a video scene is changing. Therefore, we would like to use motion as a measure of the "summarizability" of the video scene. For instance, a high speed car chase will certainly have many more "changes" in when compared to say a news-anchor shot. Thus, the high speed car chase will require more resources for a visual summary than a news-anchor shot.

Unfortunately, there are no simple objective measures to test whether in fact motion is related to scene changes. However, because change in a scene often also involves change in the color characteristics, we investigate the relationship between color-based fidelity as defined above, and an intensity of motion activity.

Let the key-frame set for shot A be $S_A$ and for shot B the set $S_B$. If set $S_A$ and set $S_B$ both contain the same number of key-frames and if the intensity of motion activity of shot A is greater than the intensity of motion activity of shot B, then the fidelity of set $S_A$ should be less than the fidelity of set $S_B$. In other words, the higher intensity of motion activity of shot A makes it less "summarizable" than shot B.

Establishing that Intensity of Motion Activity Captures Summarizability

We extract the color and motion features of standard news video programs from the MPEG-7 test-set, which is in the MPEG-1 format. We first segment the programs into shots. For each shot, we then extract the motion activity features from all the P-frames by computing the standard deviation of motion vector magnitudes of each P-frame, and a 64 bin RGB histogram from all the I-frames, both in the compressed domain.

We then determine the motion activity descriptor for each I-Frame by averaging those of the previous P-frames in the groups of P-frames. The I-Frames thus all have a histogram and a motion activity value associated with them. The motion activity of the entire shot is obtained by averaging the individual motion activity values computed above. From now on, we treat the set of I-frames in the shot as the set of frames R as defined earlier. The motion activity can be based on the average magnitude of the motion vectors.

A simple summarization method generates a single key-frame for a shot is by using the first frame of the shot, as described above. Therefore, we use the first I-frame as the key-frame, and determine its fidelity as described above. By analyzing examples of "talking head" sequences, we determine empirically that a key-frame with fidelity of at most 0.2 is of satisfactory quality. We can therefore classify the shots into two categories, A first category with key-frames having $d_{sh}$ less than or equal to 0.2, i.e., key-frames with acceptable fidelity, and a second category with key-frames with $d_{sh}$ greater than 0.2, i.e., key-frames with unacceptable fidelity.

We can also classify the shots into five categories ranging from very low to very high activity, as shown in Table A.

TABLE A

| Activity Value | Range of σ (Std. Dev. Of motion vector magnitude) |
|---|---|
| 1 (Very Low) | $0 \leq \sigma < 3.9$ |
| 2 (Low) | $3.9 \leq \sigma < 10.7$ |
| 3 (Medium) | $10.7 \leq \sigma < 17.1$ |
| 4 (High) | $17.1 \leq \sigma < 32$ |
| 5 (Very High) | $32 \leq \sigma$ |

Figure 2:
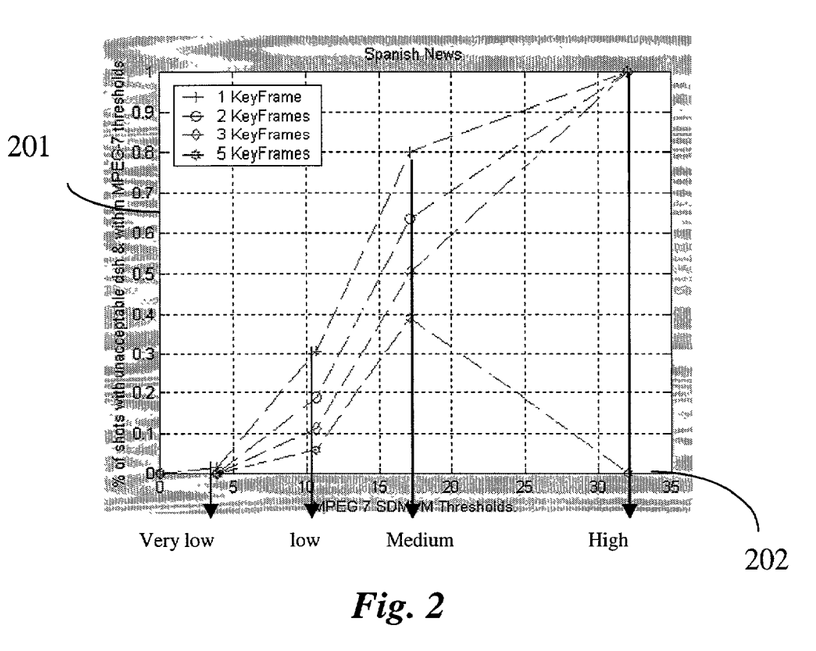
FIG. 2 is a graph plotting motion activity versus percentage of shots with unacceptable fidelity for MPEG test videos.

Then, as shown in FIG. 2, we determine the duration of shots, as percentage 201, with $d_{sh}$ greater than 0.2 in each of these categories 202 for a standard news program video (Spanish News). As the motion activity increases from very low to very high, the value of $d_{sh}$ also increases consistently. In other words, the ease of summarizability of the shots decreases as its motion activity increases.

Furthermore, the fidelity of the single key-frame is acceptable for 90% of the shots in the very low intensity of motion activity category. The same pattern can be observed with other news programs, such as the Portuguese News program from the MPEG-7 test set, as well as with news programs taken from NBC news programs. Thus, experimental evidence indicates that with a news program, the intensity of motion activity of a shot is a direct indication of its summarizability. Because news programs are diverse in content, we would expect this result to apply to a wide variety of content. Because we use the MPEG-7 thresholds for motion activity, our result is not content dependent.

Figure 3:
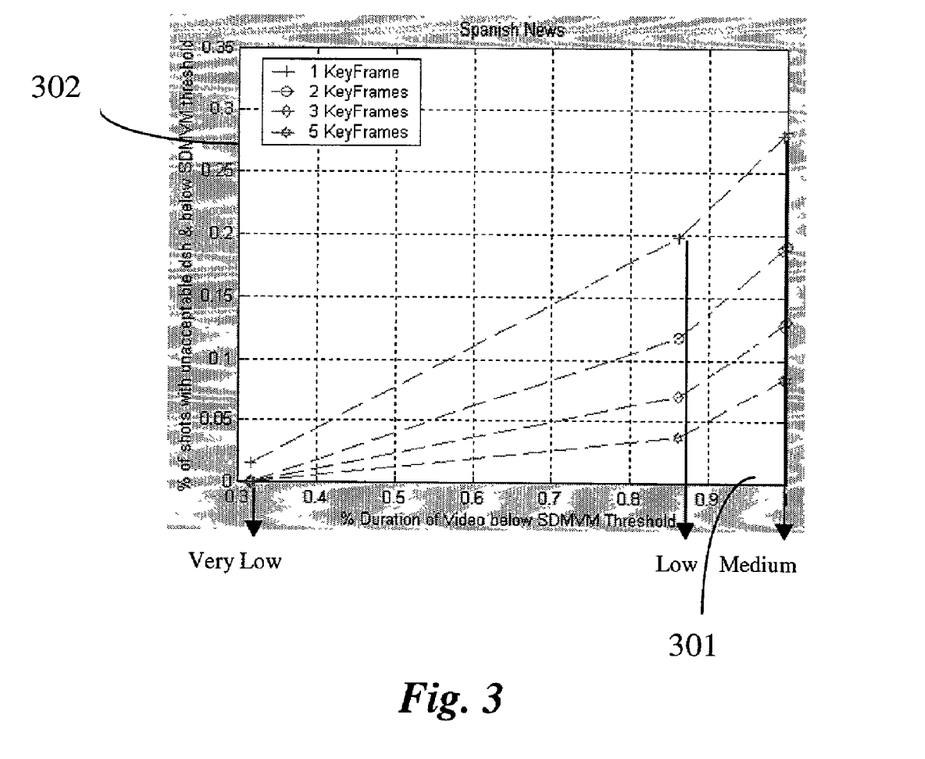
FIG. 3 is a graph plotting percentage of shot duration at or below a certain threshold vs. percentage of shots with unacceptable fidelity

FIG. 3 shows the percentage duration 301 of shots with unacceptable fidelity in shots with intensity of motion activity less than or equal to a threshold T, versus the total percentage duration 302 of shots in the program with motion activity less than or equal to T. This plot shows that for the Spanish news program, we could use the first frame of the shot as a key-frame of acceptable fidelity for 30% of the shots. We get similar results for other news programs as well. We can thus use the MPEG-7 motion activity threshold for very low action shots to find out if a shot can be well summarized by its first frame.

Summarization Method

The above results indicate that each increment of motion activity corresponds to an increment in information. Therefore, key-frames of a video can be sampled in such a way that a difference in cumulative motion activity between consecutive key-frames is uniform. Then, each key-frame provides the same increment of information as a previous key-frame.

Figure 4:
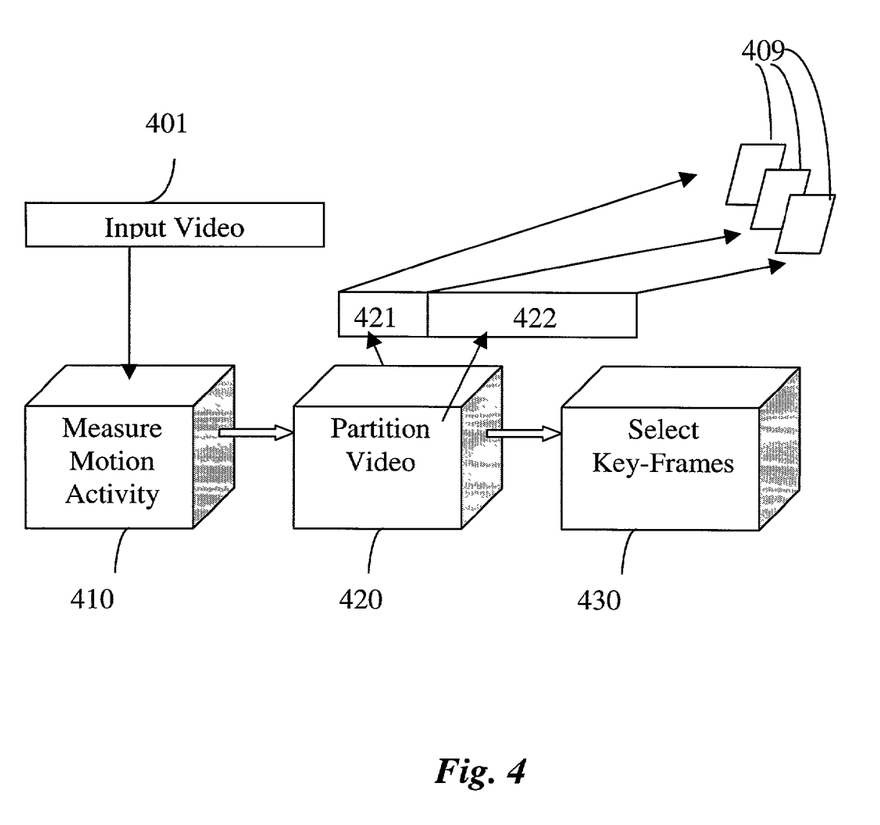
FIG. 4 is a block diagram of a video summarization method according to the present invention.

Therefore, as shown in FIG. 4, we first measure 410 an intensity of a cumulative motion activity intensity in an input video sequence 401. By a cumulative intensity we mean that the (normalized) accumulation is 0.o at the beginning of the video, and 1.0 at the end, and 0.5 somewhere in between. If the video is partitioned at the "middle" according to the motion activity, and the first part of the video has a very high level of activity, then the first part will have much fewer frames than the second part. The opposite will be the case if most of the activity is in the last half of the video. For example, if half of the activity takes place in the last six minutes (10%) of an hour video, than the "middle" of the accumulated motion (0.5) motion will be at frame 108,000–10,800—if the full video has 108,000 frames at 30 frames per second. In other words, the motion activity is essentially a time warp on the video frames. During a high level of activity fewer frames are required to accumulate motion, than during low levels of activity. And, in fact, for portions of the video where there is no motion, e.g., a "still" shot, there is no accumulation of motion at all.

Next, we partition 420 the video sequence into n-1 segments. Each segment in our partitioning has a substantially equal amount of cumulative motion activity intensity. Note, the first segment 421 has more frames but the same amount of cumulative motion as the second segment 422 with fewer frames. Then, we select a first frame of each segment, and the last frame of the sequence to obtain n key-segments. The segments are then concatenated, in temporal order, to form the summary. For example, to obtain the three key-frames 409, we partition the sequence into two segments 421–422, each with cumulative motion activity equal to half that of the entire sequence. Then, we select the first of the first and second segment, and the last frame of the sequence.

Figure 5:
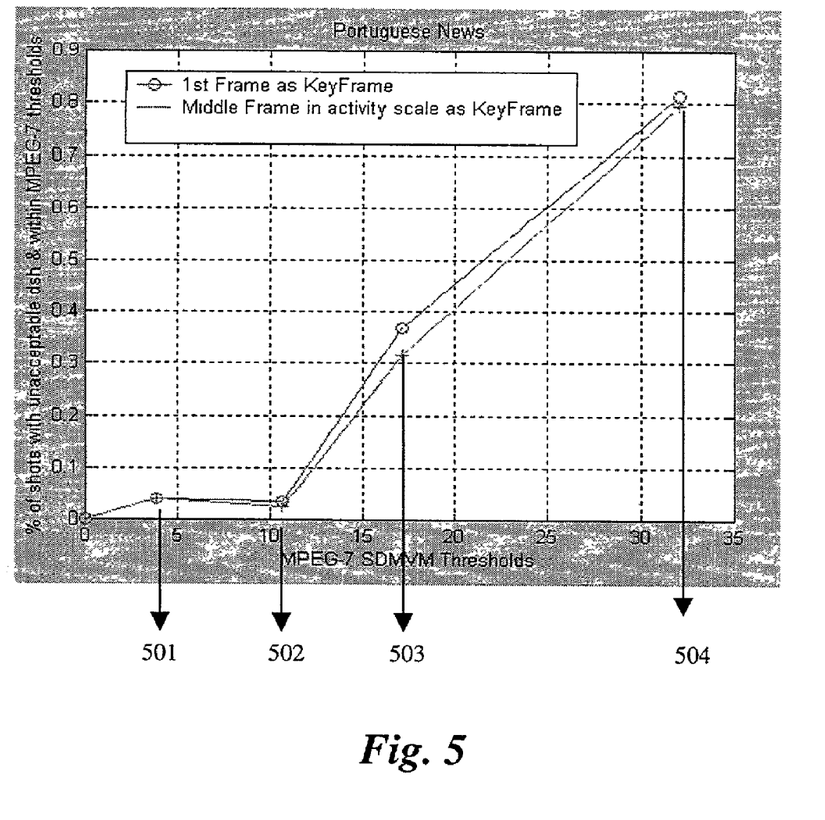
FIG. 5 is a graph comparing selecting first frames and middle frames according to the invention.
Figure 6:
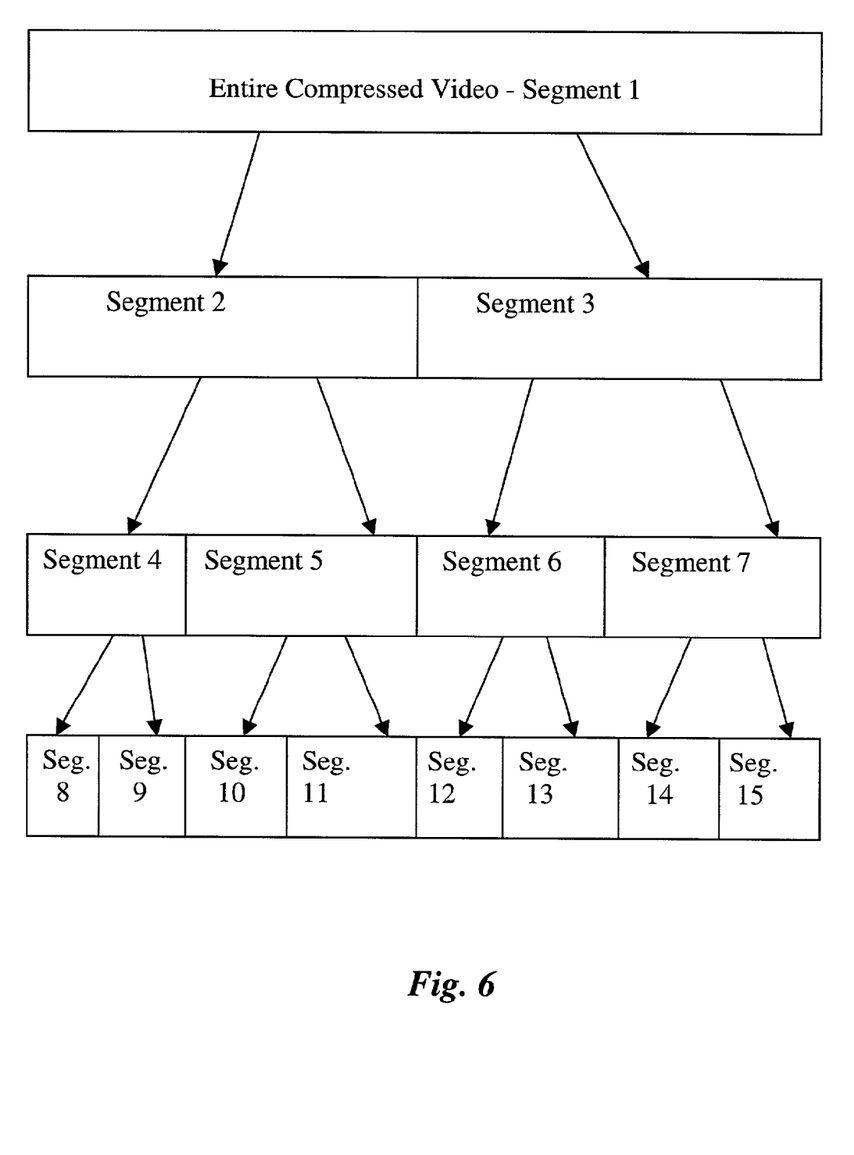
FIG. 6 is block diagram of a binary partitioning of a video.

When only a single key-frame is to be selected, the key-frame at the half-way point on the cumulative motion activity scale is probably the best. An optimal strategy therefore is to get n key-frames is to first partition the video into n segments of equal cumulative motion activity, then for each segment, choose the frame at its half-way point on the cumulative motion activity scale as its key frame. The final set of key-frames then consists of the key-frames of each of the segments obtained as above. We have found that this approach works the best. FIG. 5 compares the results obtained for selecting the first frame, top curve versus selecting the middle frame, bottom curve, for very low, low, medium, and high levels of activities, respectively 501–504. In all cases, selecting the middle frame gives slightly better results.

In other words, we perform a non-uniform sub-sampling of the video based on the intensity of motion activity. For example, if all the action in a video takes place in the first half of the video, we guarantee that all the key-frames would be drawn from the first half of the video. We can also interpret this as an activity based warping of the time axis followed by uniform sampling on the warped time axis. Note that this is an extremely fast procedure because it does not require any color comparisons at all.

This method is optimal but has the disadvantage of not being progressive. For example, an optimal single key-frame is the frame at which the cumulative motion activity is half that of the entire sequence, however the selected pair of key-frames consists of frames with cumulative motion activity=¼ and ¾ of the cumulative motion activity of the entire segment, thus the optimal key-frame pair has no frame in common with the optimal single key-frame. This implies that for each number n of key-frames, we cannot capitalize on the results obtained for a lower number of key-frames say n-1. Therefore, we use a progressive approximation of the above optimal technique as follows.

We begin with the first and the last frame, and then recursively divide each half of the video sequence into parts with equal cumulative motion activity to get 1, 3, 5, 9, etc. optimal key-frames. We can also use powers of any other number, e.g., 3. However, in digital computers powers of two are easy to compute.

Note that with the above method we can select any number of key-frames until a threshold number of frames are selected. The threshold can be determined manually or by an interactive application, or by having a fixed table of number of key-frames for each MPEG-7 intensity category described in Table 1. For most news videos, for example, five key-frames suffice. Videos in the medium, high and very high categories may require more than five key-frames.

Although the above described method uses the average motion vector magnitude as a measure of motion activity to favor segments with moving regions of significant size and activity, and the magnitude of the shortest motion vector is used as a measure of motion activity to favor segments with significant global motion. It should be understood that other statistical moments of motion such as standard deviation, median, variance, skew, and kurtosis can also be used. The MPEG-7 motion activity descriptor uses a quantized standard deviation of the standard deviation of motion vector magnitude, as per Table 1, as the measure of intensity of motion activity. It is also possible to use an unquantized standard deviation of motion vector magnitudes as a measure of motion activity.

Finally, note that our method only uses computation in the compressed domain. Therefore, our method is much faster than any prior art color-based key-frame extraction, even if those methods are applied in the compressed domain. Hence, our method can be used to assist traditional color-based extraction by using it on the substantial portion of the video that is at or below the low action threshold as per MPEG-7, and only using the color based technique on the higher action segments. We can also exclusively use our method for the entire video without resorting at all to color-based computation, which would be the computationally fastest option.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for summarizing a compressed video, comprising:
   measuring a cumulative motion activity intensity from an average motion vector magnitude in the compressed video;
   selecting key frames from the compressed video according to the cumulative motion activity intensity; and
   concatenating the key-frames in a temporal order to form a summary of the compressed video.

2. The method of claim 1 further comprising:
   partitioning the compressed video into a plurality of segments, each segment having a substantially equal amount of cumulative motion activity intensity; and
   selecting one key-frames from each segment.

3. The method of claim 2 wherein the number of segments is one less than a number of desired key-frames in the summary.

4. The method of claim 3 further comprising:
   selecting a first frame of each segment as one of the key-frames of the summary; and
   selecting a last frame of the compressed video as a last key-frame of the summary.

5. The method of claim 2 further comprising:
   selecting a middle frame according to the accumulated motion activity intensity of each segment as one of the key-frames.

6. The method of claim 1 wherein the motion activity intensity is measured from a median motion vector magnitude.

7. The method of claim 1 wherein the motion activity intensity is measured from a standard deviation of the motion vector magnitude.

8. The method of claim 1 further comprising:
   partitioning the compressed video into a plurality of segments according to shot boundaries;
   measuring the cumulative motion activity intensity in each segment;
   selecting the key frames from each segment according to the cumulative motion activity intensity; and
   concatenating the key-frames in a temporal order to form a summary of the compressed video.

9. The method of claim 1 further comprising:
   partitioning the compressed video into a plurality of segments using a binary partitioning based on the cumulative motion activity intensity, wherein a first partitioning generates one segment that includes the entire video, a second partitioning generates two segments, each segment of the second partition having a substantially equal amount of cumulative motion activity intensity, and each subsequent partitioning dividing segments of a previous partitioning into two equal halves based on the accumulated motion activity intensity until a predetermined number of segments are generated;
   selecting a middle frame from each segment according to the cumulative motion activity intensity as one of the key-frames; and
   concatenating the key-frames in a temporal order to form a summary of the compressed video.

10. A method for generating a progressive summary of a compressed video, comprising:
    selecting key-frames in a progressive ordering from the compressed video until a termination condition is reached; and
    concatenating the key-frames in a temporal order to form the progressive summary of the compressed video, the progressive ordering further comprising:
    selecting a first frame of the compressed video as a first key-frame;
    selecting a last frame of the compressed video as a second key-frame;
    measuring a cumulative motion activity intensity in the compressed video, and selecting a middle frames from the compressed video according to the cumulative motion activity intensity as a third key frame;
    partitioning the compressed video into two equal segments according to the motion activity intensity, and selecting a middle frame according to the cumulative motion activity intensity of each segment as a fourth key frame and a fifth key frame; and
    iteratively partitioning each previously partitioned segment into two smaller equal sized segments according to the motion activity intensity, and selecting further middle frames according to the cumulative motion activity intensity from each smaller sized segment as two next key-frames until the termination condition is reached.

* * * * *